United States Patent [19]

Parker

[11] 4,025,843

[45] May 24, 1977

[54] CONSTANT CURRENT BASE-DRIVE CIRCUIT

[75] Inventor: Francis F. Parker, Santa Ana, Calif.

[73] Assignee: The United States of America as represented by the Secretary of the Navy, Washington, D.C.

[22] Filed: Apr. 28, 1976

[21] Appl. No.: 680,944

[52] U.S. Cl. .......................... 323/22 T; 323/DIG. 1
[51] Int. Cl.² .......................................... G05F 1/56
[58] Field of Search ......... 321/2, 18; 323/17, 22 T, 323/DIG. 1

[56] References Cited

UNITED STATES PATENTS 3,523,239  8/1970  Heard ............................ 323/DIG. 1
3,629,622  12/1971  Denenberg ..................... 323/DIG. 1

*Primary Examiner*—A. D. Pellinen
*Attorney, Agent, or Firm*—R. S. Sciascia; G. J. Rubens; T. M. Phillips

[57] ABSTRACT

A control circuit for compensating for the change in drive current in a pulse-width modulated control circuit of a power supply. Cos Mos three input NOR gates are controlled by applying an analog voltage proportional to the charge in drive current to the third input. A negative feedback loop is then provided to compensate for changing temperature.

6 Claims, 1 Drawing Figure

U.S. Patent  May 24, 1977  4,025,843
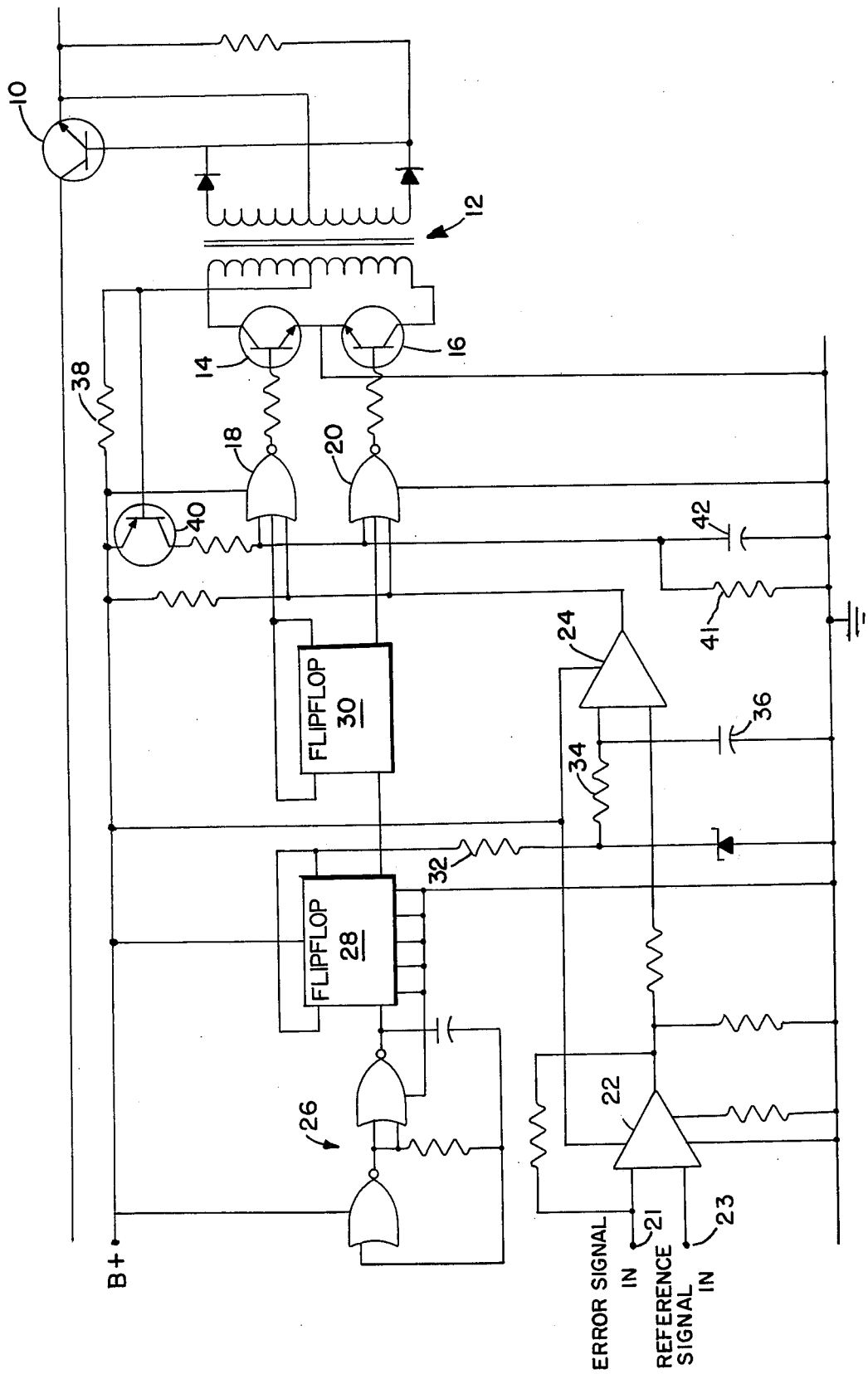

CONSTANT CURRENT BASE-DRIVE CIRCUIT

BACKGROUND OF THE INVENTION

In regulated power supplies of the series switching transistor type difficulties have arisen in that the base drive current to the series switching transistor has been found to vary with change in ambient temperature, with the drive current decreasing at lower temperatures and increasing at higher temperatures. This characteristic is opposite to that desired since the series switching transistor requires greater drive current at lower temperatures and less drive current at higher temperatures. In low temperature environments the base drive current could decrease to a level that would not allow the power supply to operate and at elevated temperatures the base drive current could increase to a point where damage to the series switching transistor could occur.

SUMMARY OF THE INVENTION

The present invention provides for a control circuit with constant current base drive. A sensing circuit is provided which senses the change in the base current for switching the series transistor and provides an analog voltage output proportional to the change in the base drive current. The derived analog voltage is applied as one input of a Cos Mos three input NOR gate to control the output level while switching digital information. An RC circuit is provided as a filter to smooth out the signal applied to the Cos Mos third input.

Accordingly, it is an object of the present invention to provide a constant current base drive circuit.

Another object of the invention is for the provision of a constant base drive circuit for series switching transistors.

A further object of the invention is the provision of a constant current base drive circuit for series switching transistors that exhibits a negative temperature coefficient.

Other objects and many of the attendant advantages of this invention will be readily appreciated as the same becomes better understood by reference to the following detailed description when considered in connection with the accompanying drawing wherein there is shown in the single figure a preferred embodiment of the invention.

DESCRIPTION OF THE PREFERRED EMBODIMENT

Referring now to the drawings wherein there is shown in the single figure a constant frequency variable pulse-width base drive circuit in which the base drive current is controlled in accordance with the teaching of the present invention. A series switching transistor 10 is supplied with a base drive current from transformer 12. The current flowong from transformer 12 to the base of transistor 10 is controlled by pulse width modulated control signals alternately applied to the bases of transistors 14 and 16. The pulse-width modulated signals gated through NOR gates 18 and 20, respectively, are generated in response to the error signal at input terminal 21. The error signal is sensed by comparing it with the reference signal at input terminal 23 and amplified by operational amplifier 22 and applied to one input of a high speed comparator 24. A conventional oscillator 26 drives D-type flip-flops 28 and 30 to provide pulses of the desired frequency. The square wave output of flip-flop 28 is integrated into a triangular wave by resistors 32, 34, and capacitor 36. The triangular wave is fed as the second input to high speed comparator 24. The constant frequency pulse-width modulated signal generated by high speed comparator 24 is alternately switched to transistors 14 and 16 by gates 18 and 20, respectively.

The base current for switching transistor 10 is sensed by the voltage drop across resistor 38. This voltage is applied to the base of transistor 40. As the voltage applied to the base of transistor 40 changes the current flowing through transistor 40 changes and provides an analog representation to the third input of gates 18 and 20. A filter network comprised of resistor 41 and capacitor 42 is used to smooth out the analog voltage applied to gates 18 and 20. Gate circuits 18 and 20 depend upon the unique characteristics of the Cos Mos three input NOR gates and may be of the RCA CD 4025 type.

In operation, when the voltage across resistor 38 equals the base to emitter voltage of transistor 40 it conducts and raises the gate voltage on each of gates 18 and 20. The output level of gates 18 and 20 are controlled while switching the pulse-width modulated signal from high speed comparator 24. The circuit exhibits a negative temperature coefficient since at elevated temperatures the base to emitter voltage of transistor 40 decreases, thereby lowering the drive current through transformer 12 to the base of transistor 10.

Obviously many modifications and variations of the present invention are possible in the light of the above teachings. It is therefore to be understood that within the scope of the appended claims the invention may be practiced otherwise than as specifically described.

What is claimed is:

1. A control circuit for providing a constant current in a base drive circuit comprising:
    a. circuit means for sensing a change in the base drive current;
    b. means coupled to said circuit sensing means for generating an analog voltage proportional to the sensed change in current in said base drive circuit;
    c. gate circuit means having first and second inputs connected for gating an input signal and a third input coupled to said analog voltage generating means and being responsive to the analog voltage applied thereto for changing the amplitude of the signal gated by said gate circuit means for controlling the current in said base drive circuit.

2. The control circuit of claim 1 wherein said gate circuit means are of the Cos Mos three input NOR gate type.

3. The control circuit of claim 1 wherein said analog voltage generating means includes a transistor having its base and emitter connected in circuit with said base drive circuit and being responsive to a voltage change as the current in the base circuit changes to provide an output voltage proportional thereto.

4. The control circuit of claim 1 wherein said circuit sensing means includes a resistor connected in series with said base drive circuit.

5. The control circit of claim 4 wherein said analog sensing means includes a transistor having its base and emitter connected across said resistor and providing an output voltage at its collector proportional to the change in drive current and further including filter circuit means connected to the collector of said transistor.

6. The control circuit of claim 5 wherein said gate circuit means includes a Cos Mos three input NOR gate having its first and second inputs connected for gating an input signal and its third input connected to the collector of said transistor for controlling the amplitude of the gated signal in response to changes in the base drive current.

* * * * *